(12) United States Patent
Gremetz et al.

(10) Patent No.: US 10,124,313 B2
(45) Date of Patent: Nov. 13, 2018

(54) MODULAR PHOTOCHEMICAL FLOW REACTOR SYSTEM

(71) Applicant: Corning Incorporated, Corning, NY (US)

(72) Inventors: Sylvain Maxime F Gremetz, Montereau Fault Yonne (FR); Clemens Rudolf Horn, Guibeville (FR); Olivier Lobet, Villiers sous Grez (FR)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/128,593

(22) PCT Filed: Mar. 20, 2015

(86) PCT No.: PCT/US2015/021622
§ 371 (c)(1),
(2) Date: Sep. 23, 2016

(87) PCT Pub. No.: WO2015/148279
PCT Pub. Date: Oct. 1, 2015

(65) Prior Publication Data
US 2017/0173553 A1    Jun. 22, 2017

(30) Foreign Application Priority Data

Mar. 26, 2014   (EP) .................................... 14305433

(51) Int. Cl.
*B01J 19/12*    (2006.01)
*B01J 19/24*    (2006.01)

(52) U.S. Cl.
CPC .......... *B01J 19/123* (2013.01); *B01J 19/127* (2013.01); *B01J 19/249* (2013.01);
(Continued)

(58) Field of Classification Search
None
See application file for complete search history.

(56) References Cited

U.S. PATENT DOCUMENTS

2005/0002835 A1   1/2005  Shaw et al.
2008/0135397 A1   6/2008  Ehrfeld et al.
(Continued)

FOREIGN PATENT DOCUMENTS

| | | |
|---|---|---|
| CN | 201147688 Y | 11/2008 |
| DE | 10222214 A1 | 12/2003 |
| KR | 2012037313 A | 4/2012 |

OTHER PUBLICATIONS

European Patent Office; Extended European Search Report for EP Application No. 14305433.6; Date of Completion of Search: Oct. 3, 2014; pp. 1-9.
(Continued)

*Primary Examiner* — Kishor Mayekar
(74) *Attorney, Agent, or Firm* — Gregory V. Bean

(57) ABSTRACT

A modular photochemical reactor system having a plurality of fluidic modules each having i) a central planar process fluid layer and ii) two outer planar thermal control fluid layers for containing flowing thermal control fluid and a plurality of illumination modules, the illumination modules of the plurality each having a planar form with first and second major surfaces and each having at least a first array of semiconductor emitters, the emitters positioned to emit from or through the first major surface, wherein the first array of semiconductor emitters has at least a first emitter and a second emitter, the first emitter capable of emitting at a first center wavelength and the second emitter capable of emitting at a second center wavelength, the first and second center wavelengths differing from each other.

10 Claims, 4 Drawing Sheets

(52) U.S. Cl.
CPC ............... *B01J 2219/0871* (2013.01); *B01J 2219/0877* (2013.01); *B01J 2219/0888* (2013.01); *B01J 2219/1206* (2013.01); *B01J 2219/1281* (2013.01); *B01J 2219/1296* (2013.01); *B01J 2219/2453* (2013.01); *B01J 2219/2458* (2013.01); *B01J 2219/2462* (2013.01); *B01J 2219/2483* (2013.01); *B01J 2219/2496* (2013.01)

(56) References Cited

U.S. PATENT DOCUMENTS

| | | |
|---|---|---|
| 2010/0255458 A1 | 10/2010 | Kinkaid |
| 2012/0091489 A1 | 4/2012 | Aoki et al. |
| 2012/0122224 A1 | 5/2012 | Schael et al. |
| 2012/0227266 A1 | 9/2012 | Meijer et al. |
| 2012/0228236 A1 | 9/2012 | Hawkins, II et al. |
| 2013/0102069 A1 | 4/2013 | Neeb et al. |
| 2014/0050630 A1 | 2/2014 | Asano et al. |
| 2014/0061027 A1 | 3/2014 | Polwart et al. |
| 2014/0161664 A1* | 6/2014 | Harris .............. A61L 2/084 422/24 |

OTHER PUBLICATIONS

European Patent Office; International Search Report and Written Opinion for International Application No. PCT/US2015/021622; dated Jul. 15, 2015; pp. 1-12.

Shvydkiv et al.; "Microphotochemistry: a reactor comparison study using the photosensitized addition of isopropanol to furanones as a model reaction"; Photochem. Photobiol. Sci., 2011, 10; pp. 1399-1404.

English Translation of CN2015800272431 First Office Aciton dated Feb. 8, 2018, China Patent Office, 9 Pgs.

* cited by examiner

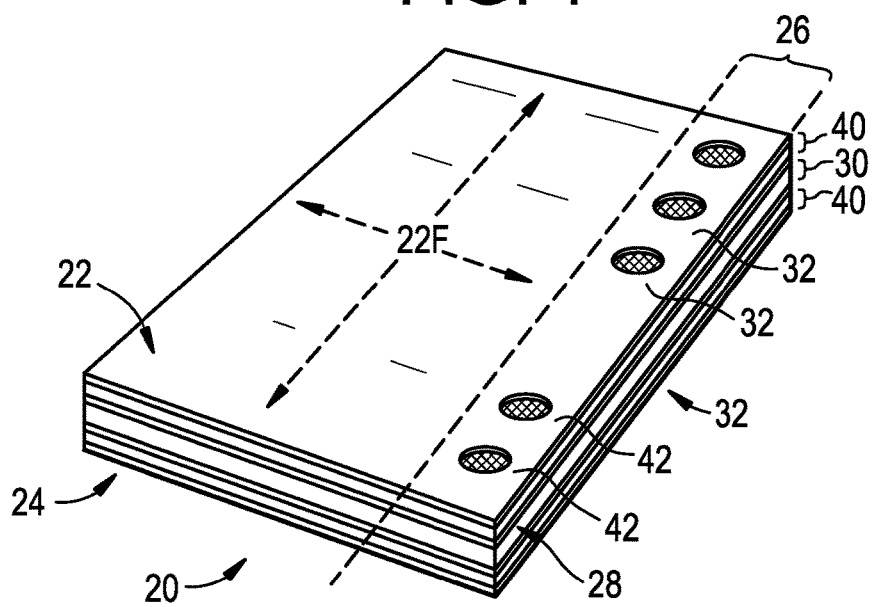
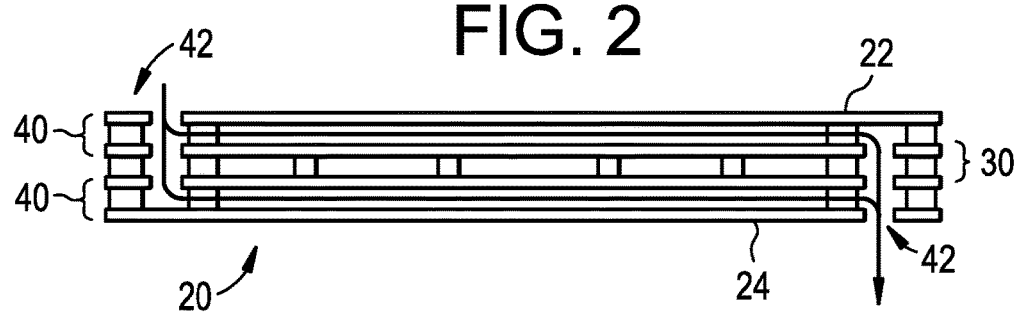

MODULAR PHOTOCHEMICAL FLOW REACTOR SYSTEM

CROSS-REFERENCE TO RELATED APPLICATIONS

This application claims the benefit of priority under 35 U.S.C. § 371 of International Patent Application Serial No. PCT/US15/21622, filed on Mar. 20, 2015, which claims the benefit of priority under 35 U.S.C. § 119 of European Patent Application No. 14305433.6, filed on Mar. 26, 2014, the contents of which are relied upon and incorporated herein by reference in their entireties.

FIELD

The present disclosure relates to flow reactors and flow processes performed therewith, in particular to a modular, flexible, and high-throughput photochemical flow reactor system.

BACKGROUND

The present inventors and/or their colleagues have previously developed flow reactors for performing chemical reactions. These flow reactors may typically employ fluidic modules that may take the form of a multilayer glass structure. A representation of one embodiment of such a fluidic module 20 is shown in FIG. 1 in perspective view. In FIGS. 2 and 3 in cross sectional views are shown representations of certain features of additional embodiments of such fluidic modules 20. Fluidic modules 20 of the type(s) shown in FIGS. 1-3 in general has a planar form and first and second major surfaces 22, 24 (with surface 24 underneath the module 20 in the perspective view of FIG. 1). Reactants or process fluids circulate inside "microchannels", channels of generally millimeter or sub-millimeter scale defined within a generally planar process fluid layer 30. The module 20 further includes two outer planar thermal control fluid layers 40 for containing flowing thermal control fluid, with the process fluid layer 30 positioned between the two thermal control fluid layers 40.

Inlet and outlet process fluid ports 32 allow supplying and removing process fluid (one of the ports 32, the outlet port in this case, is not visible in FIG. 1 because it is on the downward facing major surface 24, opposite the upward facing port 32). Inlet and outlet thermal fluid ports 42 allow supplying and removing thermal control fluid. All of the inlet and outlet ports 32, 42 are located on one of the first and second major surfaces at one or more edges thereof (at edge 26 in the case of the embodiment of FIG. 1), leaving a free surface area 22F (and corresponding free surface area 24F, underneath and not visible in FIG. 1) free of inlet and outlet ports.

Scale-up from lab scale to production scale processes is enabled by a range of various sizes of fluidic modules 20. To provide adequate residence time, for a given required flow rate, a certain amount of internal volume is required. Increased total internal volume, when needed, is provided by connecting several fluidic modules 20 in series to form a reactor. A reactor is therefore typically composed of several fluidic modules 20. Each fluidic module 20 can have specific function, like preheating, premixing, mixing, providing residence time, quenching, and so forth. Given that the modules 20 may be formed of glass, photochemistry is a potentially useful application, since glass is at least partially transparent to wavelengths of interest for photochemistry in the UV and visible spectra.

SUMMARY

The disclosed embodiments include a modular photochemical reactor system comprising a plurality of fluidic modules, each comprising: i) a central planar process fluid layer for containing flowing process fluid, ii) two outer planar thermal control fluid layers for containing flowing thermal control fluid. The system further comprises a plurality of illumination modules, the illumination modules of said plurality each having a planar form with first and second major surfaces, and each comprising at least a first array of semiconductor emitters, said emitters capable of emitting at visible and/or UV wavelengths, positioned to emit from or through the first major surface, wherein said first array of semiconductor emitters comprises at least a first emitter and a second emitter, the first emitter capable of emitting at a first center wavelength and the second emitter capable of emitting at a second center wavelength, said first and second center wavelengths differing from each other.

Use of semiconductor emitters, desirably LEDs, allows for sharply defined wavelengths to be employed with the potential of increasing the yield of a reaction or decreasing the production of undesired byproducts that may be fostered by undesired wavelengths present in sources having a broader spectrum. Providing at least first and second emitters differing in center wavelength allows easy experimentation and optimization between the two wavelengths as well as potentially increased performance for reactions that may benefit from light at more than one wavelength.

The resulting reactor assembled from the disclosed system is both flexibly reconfigurable and compact, while well-isolating the thermal output of the emitters from the reactant or process fluids. The present system and reactor formed therefrom also provides the ability to switch illumination wavelengths, or, more generally, to alter the spectral composition of the illumination without disassembly of the reactor, such that reaction testing and characterization are more easily accomplished.

Other variations and specific advantages are discussed or will be apparent from the description below. The foregoing general description and the following detailed description represent specific embodiments, and are intended to provide an overview or framework for understanding the nature and character of the claims.

BRIEF DESCRIPTION OF THE DRAWINGS

FIG. 1 is a perspective view of an embodiment of a fluidic module useful within the presently disclosed system.

FIGS. 2 and 3 are a cross sectional views of additional embodiments of fluidic modules useful within the presently disclosed system.

DETAILED DESCRIPTION

Figure 9:
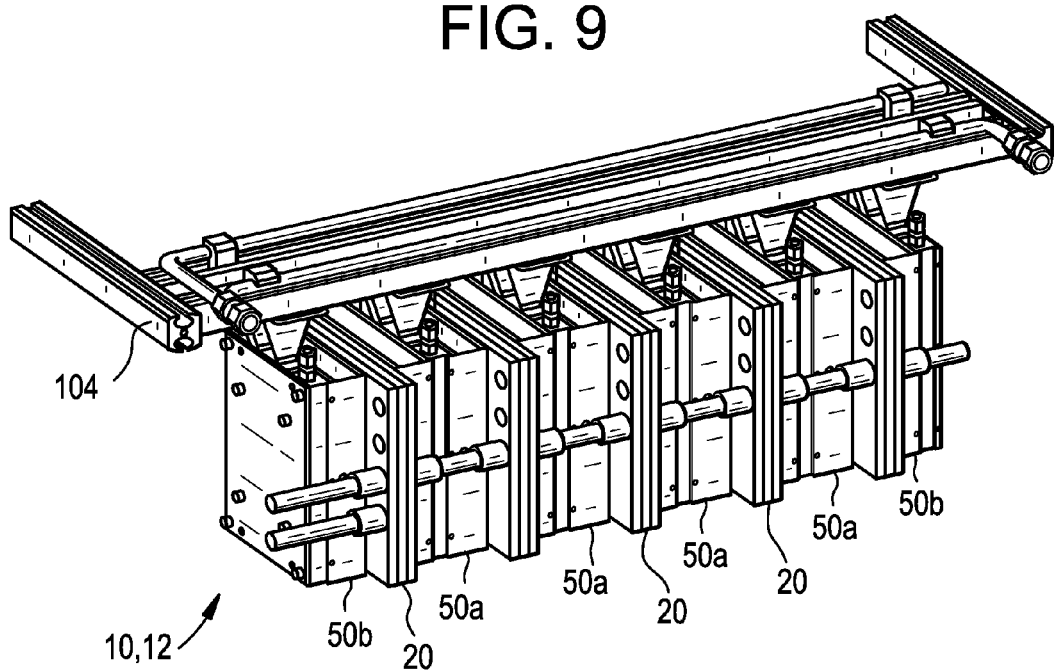
FIG. 9 is a perspective view of the reactor of FIG. 8 with some additional components included.

A modular photochemical reactor system (10) as shown in perspective view in FIG. 9 comprises a plurality of fluidic modules (20), the fluidic modules (20) of said plurality each having a planar form as seen in FIG. 1, with first and second major surfaces (22,24). Each fluidic module (20) of said plurality comprises, also as seen in FIG. 1, and additionally in FIGS. 2 and 3, a central planar process fluid layer (30) for containing flowing process fluid, and two outer planar thermal control fluid layers (40) for containing flowing thermal control fluid. The process fluid layer (30) is positioned between the two thermal control fluid layers (40). The process fluid layer (30) and the two thermal control fluid layers (40) are all at least partially radiation-transparent to at least some wavelengths in the UV and/or visible spectrum. In operation of the fluidic modules (20), substantially transparent thermal control fluids such as water or ethanol may desirably be used.

Each fluidic module (20) of said plurality further comprises inlet and outlet process fluid ports (32) for supplying and removing process fluid and inlet and outlet thermal fluid ports (42) for supplying and removing thermal control fluid, the inlet and outlet fluid ports (32) located either 1) on one of the first and second major surfaces (22, 24) at one or more edges (26) thereof, or 2) on a surface (28) of the fluidic module (20) other than the first and second major surfaces (22, 24) thereof, in either case leaving a free surface area (22F, 24F) of the first and second major surfaces (22, 24) free of inlet and outlet ports, said free surface area (22F, 24F) comprising at least 50% of the total area of the respective first or second major surface (22, 24), desirably at least 75%.

Figure 4:
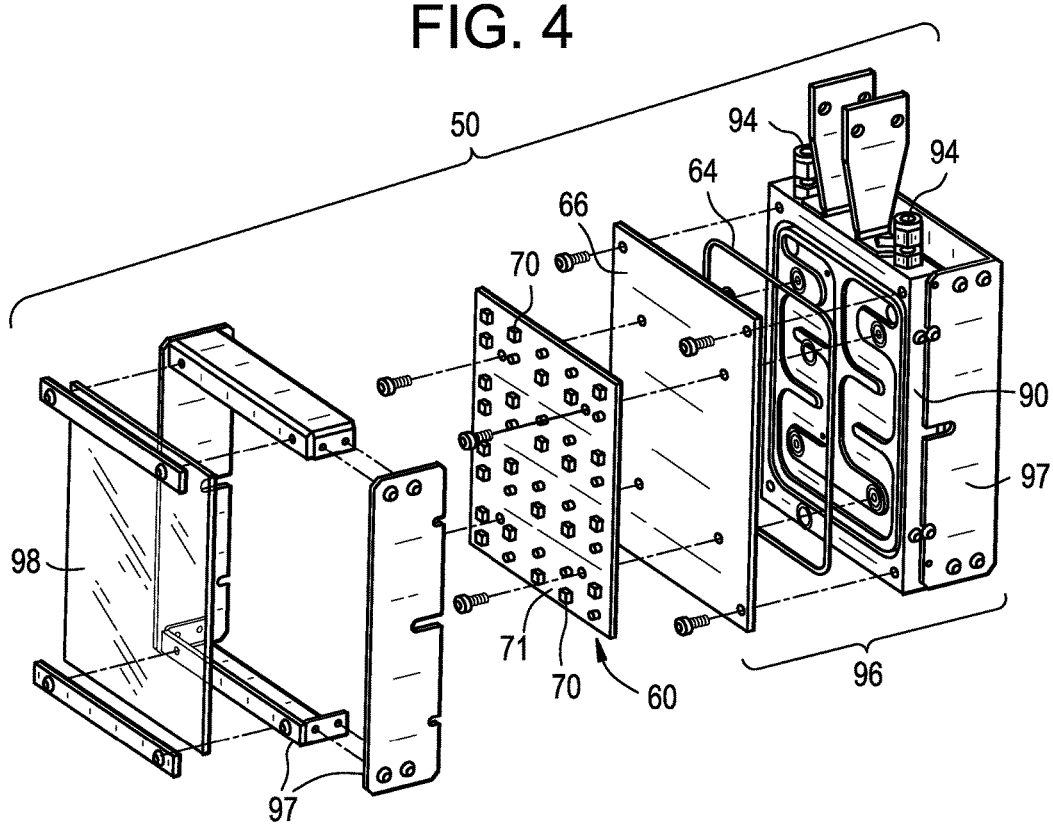
FIG. 4 is an expanded assembly perspective view of an embodiment of an illumination module useful within the presently disclosed system.
Figure 5A:
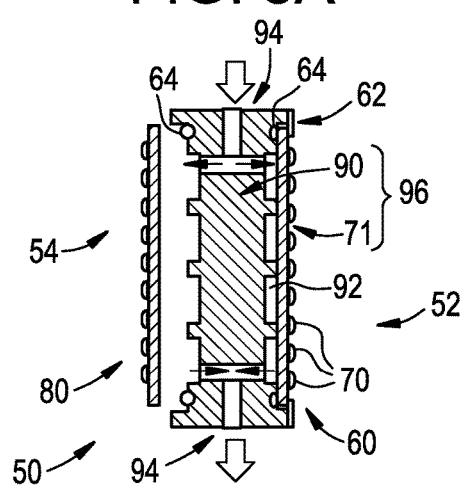
FIGS. 5A and 5B are schematic cross-sectional views of additional embodiments of illumination modules useful within the presently disclosed system.
Figure 5B:
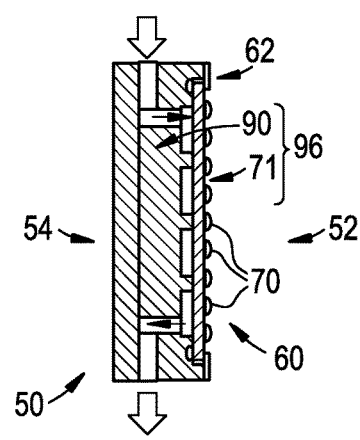

The modular photochemical reactor system (10) as shown in perspective view in FIG. 9 further comprises a plurality of illumination modules (50) such as those shown in the embodiments of the perspective view of FIG. 4 and cross sectional views of FIGS. 5A and 5B. The illumination modules (50) of said plurality each have a planar form with first and second major surfaces (52, 54), and each comprise at least a first array (60) of semiconductor emitters (70), said emitters (70) capable of emitting at visible and/or UV wavelengths, positioned to emit from or through the first major surface (52). Further, said first array (60) of semiconductor emitters (70) comprises at least a first emitter (72) and a second emitter (74), with the first emitter (72) capable of emitting at a first center wavelength and the second emitter (74) capable of emitting at a second center wavelength, where said first and second center wavelengths differ from each other.

More details of one embodiment of an illumination module are shown in the exploded perspective view of FIG. 4. A support frame or core (90) of the illumination module (50) includes inlet and outlet ports 94 for supplying cooling fluid to the illumination module 50. The core (90) together with a gasket (64) and lid (66), when assembled and fastened together in the order shown, form a heat exchanger 96 for cooling the emitters (70) of the array (60) of emitters. The emitters (70) are mounted (such as by soldering or other mounting process or structure) on a mounting sheet (71), which is attached to the lid (66). Alternatively, as in the additional embodiments shown in cross section in FIGS. 5A and 5B, the mounting sheet (71) for the emitters (70) may itself function as a lid to cover fluid channels in the core (90), such that a separate lid (66) as in the embodiment of FIG. 4 is not used. A light shield or frame (97) may be attached so as to surround the array (60) on the sides thereof, and a protective window (98) may be mounted to the shield (97). The protective window may be of quartz, glass, or any other desirably transparent material relative to the wavelength(s) employed by the illumination module (50), and may optionally include a roughened structure or similar optical feature so as to function as an optical diffuser to even out the illumination provided by the illumination module (50). As another optional alternative, the window (98) and frame (97) may also cooperate to form a hermetic seal over the array (60), and the sealed volume may be filled with an inert gas such as argon or low-reactivity gas such as nitrogen. This would serve to protect the emitters from any airborne chemical or chemicals otherwise present on or near the protective window (98).

FIGS. 5A and 5B are schematic cross-sectional views of additional embodiments of illumination modules (50). In FIG. 5A it may be more clearly seen (than in FIG. 4) that an illumination module (50) according to the present disclosure may desirably include both a first array (of emitters 70) 60 and a second array (of emitters 70) 80, on opposing first and second major surfaces (52, 54) of the illumination module (50). A single core (90) may have two sides each with a surface for supporting each of the two arrays (60,80). The array(s) may be retained by a clip or ledge (62). As illustrated generally in FIG. 5B, the presently disclosed system also desirably includes illumination modules (50) having only one array (60), rather than two arrays (60,80) as in FIG. 5A.

Figure 6:
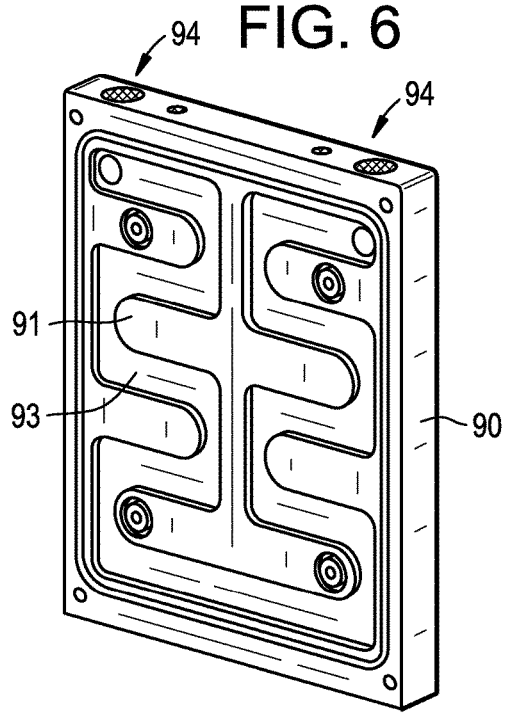
FIG. 6 is a perspective view of an embodiment of a support frame or core of an illumination module useful within the presently disclosed system.

FIG. 6 shows a perspective view of an embodiment of a core (90), including a support surface (91) for the emitter array (60) or the lid (66), into which support surface are recessed channels 93 for containing flowing cooling fluid.

Figure 7A:
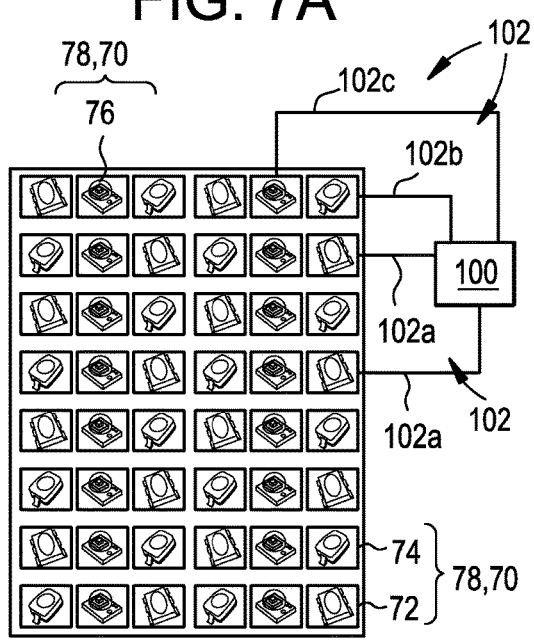
FIGS. 7A and 7B are schematic plan view representations of alternative embodiments of emitter arrays of an illumination module useful within the presently disclosed system.
Figure 7B:
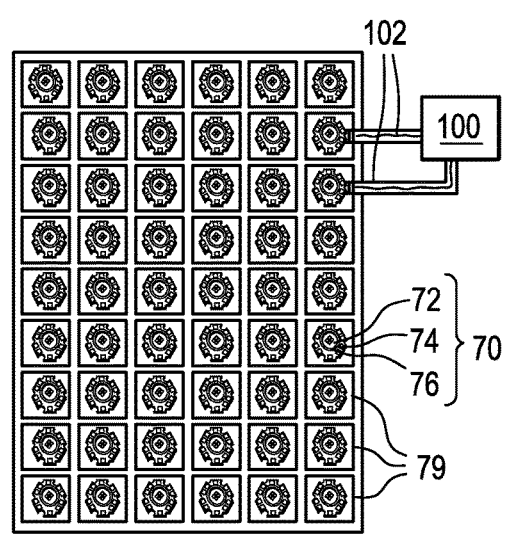

FIGS. 7A and 7B are schematic plan view representations of alternative embodiments of emitter arrays (60) (and 80) of an illumination module (50) such as those in FIGS. 4, 5A and 5B. In the embodiment of FIG. 7A, the emitters 70 are in the form of individually packaged emitters (or individually packaged LEDs) 78, while in the embodiment of FIG. 7B the emitters 70 are in the form of groups 79 of emitters (such as "multi-chip" LEDs) (of different types 72, 74, 76), at least two types minimum, packaged together. In both embodiments, there is at least a first emitter (72) and a second emitter (74), with the second emitter (74) having a second center wavelength differing from a first center wavelength of the first emitter (72). Optionally, the array (60) (or (80)) may further comprise at least a third emitter (76) capable of emitting at a third center wavelength, with the third center wavelength differing from each of the first and second center wavelengths. More than three different emitters or types of emitters may also be employed. Also, grouped emitters (or groups of emitters) 79 may be used within the same array as individual emitters.

Regardless of the number of different types and whether they are packaged together, it is also desirable that the various different types of emitters (72, 74, 76) be independently controllable by switch or controller or receiver 100, through respective control and/or power lines (102a, 102b, 102c) (labeled generally 102). Preferably, the various sub-arrays of emitters, each formed by the emitters of the same wavelength, are independently controllable by switch or controller or receiver. The emitters of the same wavelength or center wavelength on an array are desirably controlled collectively. Independent control over the various wavelengths allows for easy reaction characterization or other experimentation or reaction control involving use of various wavelengths, without having to disassemble the reactor or any components.

The emitters (70) are desirably LEDs. According to an embodiment, the array comprises a Printed Circuit Board on which the emitters are mounted. In addition, they are desirably capable of providing at least 40 mW/cm2 homogeneous irradiation to the free surface area (22F, 24F) of the first or second major surface (22, 24) of a fluidic module (20), more desirably at least 50 mW/cm2. The LEDs may be high power LEDs, or their density on the array may be sufficient to achieve the desired irradiation. A desired degree of homogeneity of irradiation may be achieved through the density of LEDs on the array, or through an optical diffuser.

Figure 8:
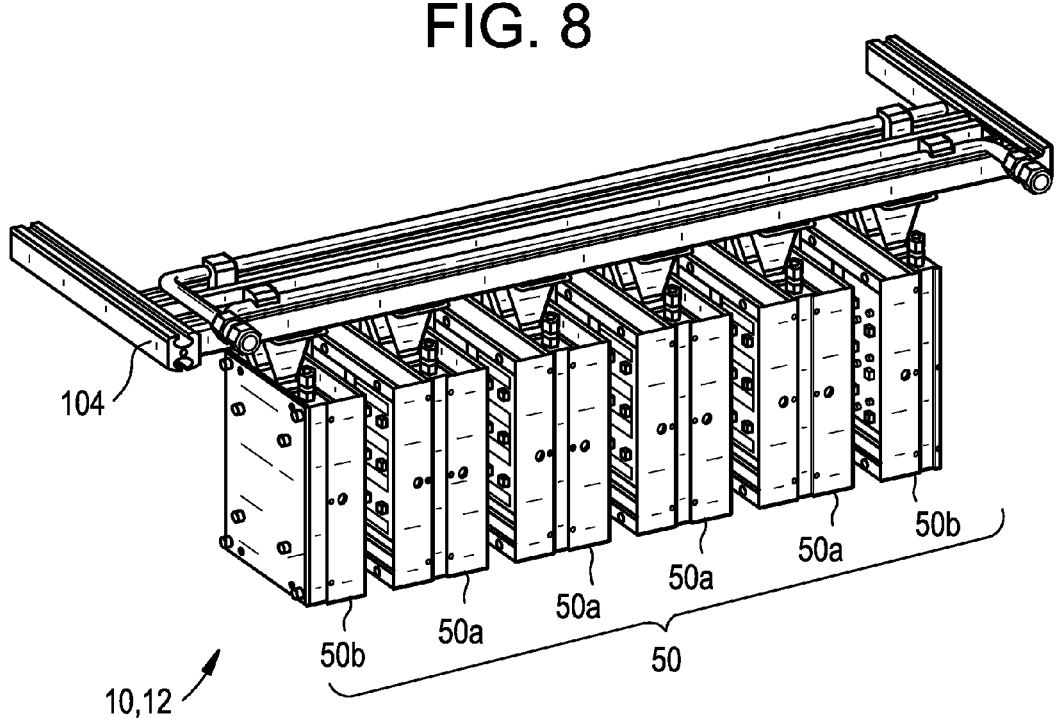
FIG. 8 is a perspective view of an embodiment of a partially assembled reactor comprised of components of the presently disclosed system.

FIGS. 8 and 9 show perspective views illustrating an embodiment of certain ways in which the system (10) of the present disclosure may be assembled into a reactor (12). In FIGS. 8 and 9, fluidic modules (20) and illumination modules (50) are supported on a reactor support or mount (104), in this case in the form of a beam. Alternatively, the fluidic modules (20) and the illumination modules (50) may be supported on 2 separate supports or mounts, and the illumination modules (50) and their support or mount may be slid in and out of the reactor in order to ease the maintenance of the system. Illumination modules (50) in these embodiments include both two-sided illumination modules (50a) and single-sided illumination modules (50b). In FIG. 8 the reactor 12 is shown without the fluidic modules 20 included. FIG. 9 shows the position of multiple fluidic modules (20) between the radiative faces of the illumination modules (50).

Reactors (12) formed of the system (10) are both flexibly reconfigurable and compact, while well-isolating the thermal output of the emitters from the reactant or process fluids, first because of the use of semiconductor emitters such as LEDs in which energy conversion efficiency is reasonably high, in contrast to lamps and other similar sources, and second because of the use of heat exchanger (96) which is capable of extracting even as much as multiple hundred watts, and third because the process fluid layer (30) of the fluidic module (20) is surrounded on both sides by a thermal control fluid layer (40) through which incoming illumination arrives, providing thereby significant isolation from any heat generated by or at the emitters (70). Reactors (12) formed of the system (10) also enable LED emitters to be operated at low temperature (below room temperature and fluidic module operating temperature), through the use of heat exchangers (96), resulting in increased emitted intensity and increased LED lifetime.

The present system and reactor formed therefrom also provides the ability to switch illumination wavelengths, or, more generally, to alter the spectral composition of the illumination without disassembly of the reactor, such that reaction testing and characterization are more easily accomplished. It is advantageous to be able to perform photochemical reactions in a flow reactor that is compact yet flexible in both reactor structure or design as well as in the radiation supplied. Light wavelength of interest is mainly near UV and violet light between 300 and 450 nm, but other UV or visible wavelengths may also be of interest.

Having the working fluid layer (30) illuminated from both sides of fluidic modules (20), through the thermal control layers (40) not only helps provide thermal isolation, but also delivers a large amount of illumination to the process fluid and may allow more uniform penetration through the depth of the process channel, relative to illuminating on only one major surface of the fluidic module (20).

It should be noted that not all fluidic modules (20) in a given reactor will necessarily require or benefit from irradiation, accordingly, some fluidic modules may not be illuminated within the same reactor in which some others are. In other words, the illumination is scalable independently or together with the number of fluidic modules.

Different kind of chemistries can be therefore performed with same lighting solution, without any change of equipment, without any maintenance. This is not equipment specific to 1 single wavelength.

By the use of spectrally narrower light from semiconductor sources, chemistries can be better understood and therefore optimized. Accurate wavelength of the semiconductor sources allows getting more product selectivity. Lifetime of the light source should also be long.

The methods and/or devices disclosed herein are generally useful in performing any process that involves mixing, separation, extraction, crystallization, precipitation, or otherwise processing fluids or mixtures of fluids, including multiphase mixtures of fluids—and including fluids or mixtures of fluids including multiphase mixtures of fluids that also contain solids—within a microstructure. The processing may include a physical process, a chemical reaction defined as a process that results in the interconversion of organic, inorganic, or both organic and inorganic species, and desirably includes a chemical, physical, or biological process or reaction favored in the presence of light, of whatever wavelength, i.e., photoreactions, whether photosensitized, photoinitiated (as in photoinitiated radical reactions), photoactivated, photocatalytic, photosynthetic, or other). A non-limiting list of light-assisted or light-favored reactions of potential interest includes photoisomerizations, rearrangements, photoreductions, cyclizations, 2+2 cycloadditions, 4+2 cycloadditions, 4+4 cycloadditions, 1,3-dipolar cycloadditions, sigmatropic shifts (which could result in cyclisation), photooxidation, photocleavage of protecting groups or linkers, photohalogenations (phtochlorinations, photobrominations), photosulfochlorinations, photosulfoxidations, photopolymerizations, photonitrosations, photodecarboxylations, photosynthesis of previtamin D, decomposition of azo-compounds, Norrish type reactions, Barton type reactions. Further, the following non-limiting list of reactions may be performed with the disclosed methods and/or devices: oxidation; reduction; substitution; elimination; addition; ligand exchange; metal exchange; and ion exchange. More specifically, reactions of any of the following non-limiting list may be performed with the disclosed methods and/or devices: polymerisation; alkylation; dealkylation; nitration; peroxidation; sulfoxidation; epoxidation; ammoxidation; hydrogenation; dehydrogenation; organometallic reactions; precious metal chemistry/homogeneous catalyst reactions; carbonylation; thiocarbonylation; alkoxylation; halogenation; dehydrohalogenation; dehalogenation; hydroformylation; carboxylation; decarboxylation; amination; arylation; peptide coupling; aldol condensation; cyclocondensation; dehydrocyclization; esterification; amidation; heterocyclic synthesis; dehydration; alcoholysis; hydrolysis; ammonolysis; etherification; enzymatic synthesis; ketalization; saponification; isomerisation; quaternization; formylation; phase transfer reactions; silylations; nitrile synthesis; phosphorylation; ozonolysis; azide chemistry; metathesis; hydrosilylation; coupling reactions; and enzymatic reactions.

The foregoing description provides exemplary embodiments to facilitate an understanding of the nature and character of the claims. It will be apparent to those skilled in the art that various modifications to these embodiments can be made without departing from the spirit and scope of the appending claims.

What is claimed is:

1. A modular photochemical reactor system comprising:
   a plurality of fluidic modules each having i) a central planar process fluid layer and ii) two outer planar thermal control fluid layers for containing flowing thermal control fluid; and
   a plurality of illumination modules each having a planar form with first and second major surfaces, and each comprising at least a first array of semiconductor emitters, said emitters capable of emitting at visible and/or UV wavelengths and being positioned to emit from or through the first major surface and through the outer planar thermal control fluid layer of a fluidic module of the plurality of fluidic modules to the central planar process layer of the fluidic module of the plurality of fluidic modules, wherein said first array of semiconductor emitters comprises at least a first emitter and a second emitter, the first emitter capable of emitting at a first center wavelength and the second emitter capable of emitting at a second center wavelength, said first and second center wavelengths differing from each other.

2. The system according to claim 1 wherein said first array further comprises at least a third emitter capable of emitting at a third center wavelength, said third center wavelength differing from each of the first and second center wavelengths.

3. The system according to claim 1 wherein the emitters comprise individually packaged emitters.

4. The system according to claim 1 wherein the emitters comprise emitters packaged in groups and wherein said groups-contain at least one first emitter and at least one second emitter.

5. The system according to claim 1 wherein said at least one first emitter within said first array is connected to a first power or control line and said at least one second emitter within said first array-is connected to a second power or control line.

6. The system according to claim 1 wherein the plurality of illumination modules comprises at least one illumination module which itself further comprises a second array of semiconductor emitters capable of emitting at visible and/or UV wavelengths and positioned to emit from or through the second major surface, said second array of semiconductor emitters comprising at least one first emitter and at least one second emitter.

7. The system according to claim 6 wherein said at least one illumination module of said plurality of illumination modules further comprises a heat exchanger including a cooling fluid passage therein having inlet and outlet ports, the heat exchanger being in thermal contact with the emitters of the first array and with the emitters of the second array.

8. The system according to claim 1 wherein said illumination modules of said plurality each further comprise a heat exchanger including a cooling fluid passage therein having inlet and outlet ports, the heat exchanger being in thermal contact with the emitters-of the first array.

9. The system according to claim 1, wherein the emitters are light emitting diodes (LEDs).

10. The system according to claim 9 wherein the LEDs are capable of providing at least of 40 mW/cm2 to an area free of inlet and outlet ports of the first or second major surface of the fluidic module of the plurality of fluidic modules.

* * * * *

UNITED STATES PATENT AND TRADEMARK OFFICE
CERTIFICATE OF CORRECTION

PATENT NO. : 10,124,313 B2
APPLICATION NO. : 15/128593
DATED : November 13, 2018
INVENTOR(S) : Sylvain Maxime F Gremetz et al.

Page 1 of 1

It is certified that error appears in the above-identified patent and that said Letters Patent is hereby corrected as shown below:

On the Title Page

On page 2, Column 2, item (56), other publications, Line 8, delete "CN2015800272431" and insert -- CN201580027243.7 --, therefor.

On page 2, Column 2, item (56), other publications, Line 8, delete "Aciton" and insert -- Action --, therefor.

In the Claims

In Column 8, Line 3, Claim 4, delete "groups-contain" and insert -- groups contain --, therefor.

In Column 8, Line 8, Claim 5, delete "array-is" and insert -- array is --, therefor.

Signed and Sealed this
Nineteenth Day of January, 2021

Andrei Iancu
*Director of the United States Patent and Trademark Office*